(12) United States Patent
Kalinowski et al.

(10) Patent No.: US 11,254,342 B2
(45) Date of Patent: Feb. 22, 2022

(54) DELIVERY SLED BRAKE SYSTEM

(71) Applicant: Rehrig Pacific Company, Los Angeles, CA (US)

(72) Inventors: Dane Gin Mun Kalinowski, Foothill Ranch, CA (US); Travis James Englert, Brea, CA (US); William Robinson, Los Angeles, CA (US)

(73) Assignee: Rehrig Pacific Company, Los Angeles, CA (US)

( * ) Notice: Subject to any disclaimer, the term of this patent is extended or adjusted under 35 U.S.C. 154(b) by 366 days.

(21) Appl. No.: 15/788,967

(22) Filed: Oct. 20, 2017

(65) Prior Publication Data

US 2018/0162434 A1    Jun. 14, 2018

Related U.S. Application Data

(60) Provisional application No. 62/538,258, filed on Jul. 28, 2017, provisional application No. 62/412,491, filed on Oct. 25, 2016.

(51) Int. Cl.
*B62B 5/04* (2006.01)
*B62B 3/04* (2006.01)
(Continued)

(52) U.S. Cl.
CPC ............ *B62B 5/048* (2013.01); *B62B 3/04* (2013.01); *B62B 5/04* (2013.01); *B62B 5/0442* (2013.01);
(Continued)

(58) Field of Classification Search
CPC ....... B62B 5/0485; B62B 5/04; B62B 5/0461; B62B 3/04; A63C 17/1409;
(Continued)

(56) References Cited

U.S. PATENT DOCUMENTS 2,732,022 A  *  1/1956  Lapsley .............. B66F 9/07568
                                                  180/6.28
3,117,653 A  *  1/1964  Altherr .................... B62B 5/04
                                                  188/20
(Continued)

FOREIGN PATENT DOCUMENTS

CN       105439043       3/2016
GB         2190063      11/1987
KR      20110023998       3/2011

OTHER PUBLICATIONS

Uline Pallet Truck Model No. H-4121; retrieved Mar. 14, 2015; https://www.uline.com/Product/Detail/H-4121/Pallet-Trucks/Uline-Pallet-Truck-Hand-Brake-48-x-27.*
(Continued)

*Primary Examiner* — Emma K Frick
(74) *Attorney, Agent, or Firm* — Carlson, Gaskey & Olds, P.C.

(57) ABSTRACT

A pallet sled includes a base and a plurality of tines extending forward from the base. At least one of the plurality of tines includes a wheel supporting the tine away from the base. A brake assembly is positioned adjacent the wheel to selectively brake the wheel. The brake assembly may include a drum adjacent the wheel. Alternatively, the brake assembly may include a brake shoe selectively directly contacting the wheel to brake the sled.

21 Claims, 9 Drawing Sheets

(51) Int. Cl.
*B66F 9/075* (2006.01)
*B66F 9/12* (2006.01)
*G06Q 10/08* (2012.01)

(52) U.S. Cl.
CPC ........ *B62B 5/0452* (2013.01); *B66F 9/07509* (2013.01); *B62B 2202/031* (2013.01); *B62B 2301/0467* (2013.01); *B66F 9/12* (2013.01); *G06Q 10/08* (2013.01)

(58) Field of Classification Search
CPC ... A63C 17/1418; B60T 1/04; B66F 9/07509; A61G 5/101; A61G 5/1018
See application file for complete search history.

(56) References Cited

U.S. PATENT DOCUMENTS

| | | | | |
|---|---|---|---|---|
| 3,360,082 | A * | 12/1967 | Grubis | B60T 1/04 188/29 |
| 3,486,587 | A * | 12/1969 | Malloy | B60T 1/04 188/22 |
| 3,532,188 | A | 10/1970 | Kelz | |
| 3,664,465 | A * | 5/1972 | Holland | B60T 11/107 188/10 |
| 3,890,669 | A * | 6/1975 | Reinhards | B60B 33/021 16/35 R |
| 4,027,771 | A * | 6/1977 | Adams | B62B 3/0625 280/43.12 |
| 4,258,831 | A * | 3/1981 | Weber | B62B 5/04 188/119 |
| 4,349,937 | A * | 9/1982 | Fontana | B60B 33/0078 16/35 R |
| 4,424,885 | A | 1/1984 | Kedem | |
| 4,669,561 | A * | 6/1987 | Sheen | B62B 3/0612 180/19.1 |
| 4,706,328 | A * | 11/1987 | Broeske | B60B 33/0078 16/35 R |
| 4,816,998 | A * | 3/1989 | Ahlbom | G05D 1/0272 180/167 |
| 4,835,815 | A * | 6/1989 | Mellwig | B60B 33/0078 16/35 R |
| 4,887,830 | A * | 12/1989 | Fought | A61G 5/1018 280/304.1 |
| 5,325,938 | A * | 7/1994 | King | B62B 5/0419 188/19 |
| 5,524,732 | A | 6/1996 | Koke | |
| 5,531,295 | A * | 7/1996 | Kopman | B60T 1/04 188/17 |
| 5,667,236 | A * | 9/1997 | Murphy | A61G 5/1018 188/2 F |
| 5,678,977 | A * | 10/1997 | Nordlund | B60P 1/027 414/458 |
| 5,722,515 | A | 3/1998 | Wyse | |
| 5,752,584 | A | 5/1998 | Magoto et al. | |
| 5,927,441 | A * | 7/1999 | Luo | B62B 5/04 188/19 |
| 6,409,187 | B1 * | 6/2002 | Crow, Jr. | B62B 5/04 188/20 |
| 6,443,268 | B1 * | 9/2002 | Dearth | A61G 5/1018 188/2 F |
| 6,454,512 | B1 * | 9/2002 | Weiss | B62B 3/006 118/500 |
| 6,464,025 | B1 | 10/2002 | Koeper et al. | |
| 6,561,745 | B2 * | 5/2003 | Rountree | B62B 1/10 280/47.27 |
| 7,255,206 | B1 * | 8/2007 | Hackbarth | B62B 5/04 188/19 |
| 7,270,201 | B1 * | 9/2007 | Cryer | B60S 13/00 180/19.2 |
| 7,856,932 | B2 | 12/2010 | Stahl et al. | |
| 7,987,797 | B2 | 8/2011 | Stahl et al. | |
| 7,988,405 | B2 | 8/2011 | Ellington | |
| 8,011,677 | B1 | 9/2011 | Ellington et al. | |
| 8,075,244 | B2 | 12/2011 | Ellington | |
| 8,079,606 | B2 * | 12/2011 | Dull | B60B 33/0005 16/35 R |
| 8,282,111 | B2 | 10/2012 | Hailston et al. | |
| 8,360,443 | B2 | 1/2013 | Ellington | |
| 8,776,697 | B1 | 7/2014 | O'Connell | |
| 8,783,420 | B2 * | 7/2014 | Lai | A45C 5/145 188/69 |
| 8,894,076 | B2 | 11/2014 | Hailston et al. | |
| 8,910,953 | B2 * | 12/2014 | Faulhaber | B62B 5/04 280/33.994 |
| 8,950,759 | B2 | 2/2015 | Thorsen et al. | |
| 9,108,657 | B2 * | 8/2015 | Hussain | B62B 5/0442 |
| 9,260,125 | B2 | 2/2016 | Ellington et al. | |
| 9,809,434 | B2 * | 11/2017 | Magoto | B65D 19/0018 |
| 10,377,403 | B2 * | 8/2019 | Lee | B60K 1/04 |
| 10,793,176 | B2 * | 10/2020 | King | B62B 3/0631 |
| 2005/0199449 | A1 * | 9/2005 | Tanksley | A61G 5/1018 188/19 |
| 2008/0042381 | A1 | 2/2008 | Hartmann et al. | |
| 2008/0164101 | A1 | 7/2008 | Stone | |
| 2009/0183953 | A1 | 7/2009 | Ellington | |
| 2009/0185890 | A1 | 7/2009 | Ellington | |
| 2010/0295261 | A1 | 11/2010 | Ellington | |
| 2011/0057405 | A1 * | 3/2011 | Filasky | B62B 5/0013 280/79.5 |
| 2011/0061979 | A1 * | 3/2011 | Tai | B60T 1/04 188/22 |
| 2011/0171000 | A1 | 7/2011 | Hailston | |
| 2012/0098218 | A1 * | 4/2012 | Richard | B62B 5/0438 280/47.24 |
| 2013/0202400 | A1 | 8/2013 | Richard et al. | |
| 2013/0223962 | A1 | 8/2013 | Ellington et al. | |
| 2015/0225215 | A1 | 8/2015 | King et al. | |
| 2016/0107671 | A1 * | 4/2016 | Wyse | B60T 7/12 280/47.24 |
| 2017/0240194 | A1 | 8/2017 | Kalinowski et al. | |
| 2017/0297881 | A1 | 10/2017 | King et al. | |

OTHER PUBLICATIONS

U.S. Appl. No. 15/639,266, filed Jun. 30, 2017.
U.S. Appl. No. 15/606,598, filed May 26, 2017.

* cited by examiner

DELIVERY SLED BRAKE SYSTEM

BACKGROUND

The development of direct store delivery (DSD) systems increases delivery efficiencies across several industries including Beverage and Food Service by reducing the amount of time and labor a driver needs to deliver product (raw goods, finished goods, etc.) to the restaurant or store.

The DSD system allows the driver to transport a loaded pallet directly from the trailer to inside the store without having to down stack product onto a hand truck and making multiple trips back and forth. The product can then be merchandised on the shelf or in the cooler or stored in the back room directly on the pallet. The DSD systems have optimized equipment (electric lift and/or hydraulic sled) with a small footprint and maneuverability to fit in tight aisles, hallways, and coolers to maximize delivery efficiency.

SUMMARY

A pallet sled particularly suited for a DSD system includes a base and a plurality of tines extending forward from the base. At least one of the plurality of tines includes a wheel supporting the tine away from the base, e.g. toward a forward end of the tine. A brake assembly is positioned adjacent the wheel to selectively brake the wheel.

The brake assembly may include a drum adjacent the wheel. Alternatively, the brake assembly may include a brake shoe selectively directly contacting the wheel to brake the sled. The wheel may be supported on an axle connected to a cradle. The brake shoe may include a first arm pivotably connected to the cradle about a first axis and a second arm extending from the first axis to a second axis pivotably connected to the brake shoe.

By mounting the braking system on the fork tine wheel assemblies instead of the base, the complication of braking the casters that pivot under the base is avoided. Braking on the fork tine wheels also creates more controlled braking since the fork tine wheels are more centrally located with the pallet load.

DETAILED DESCRIPTION OF A PREFERRED EMBODIMENT

Figure 1:
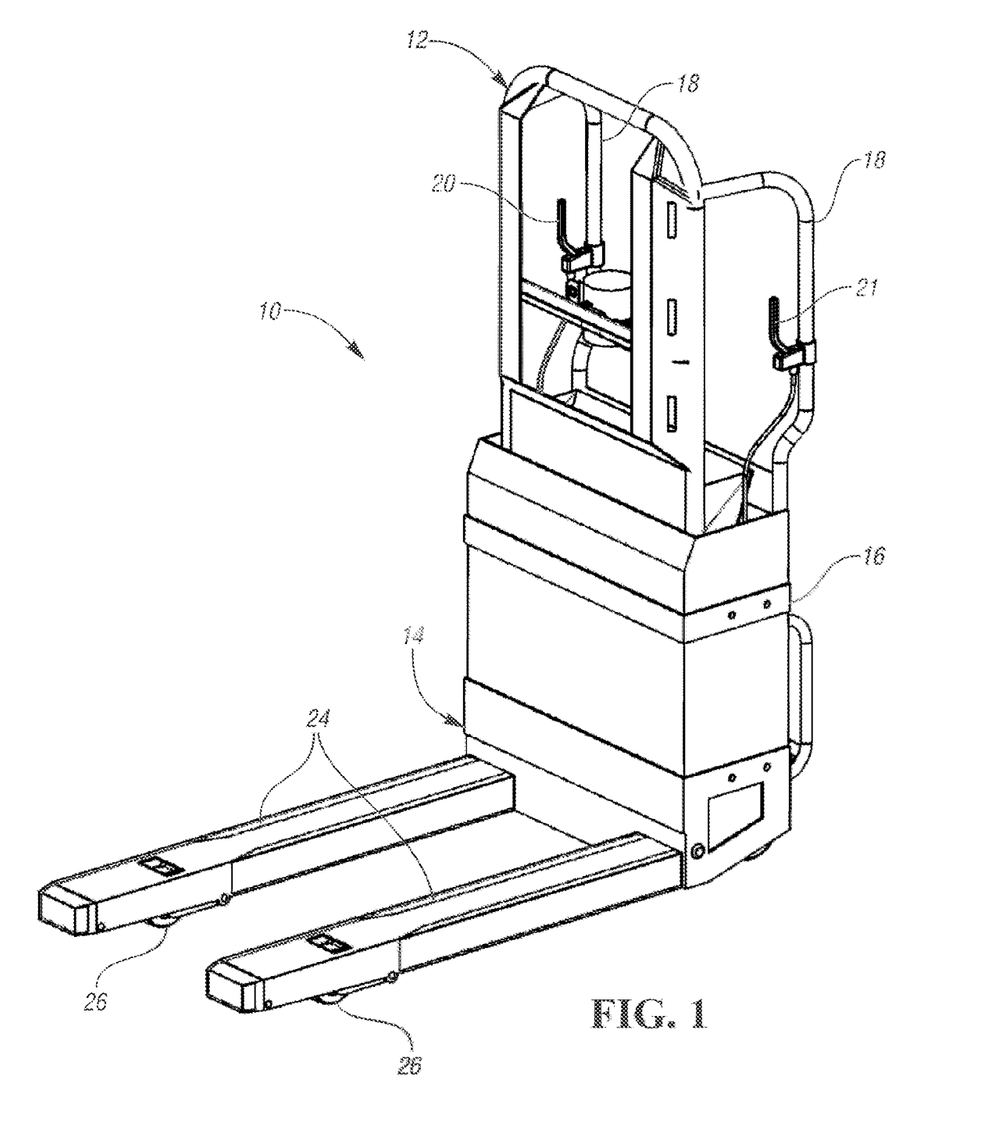
FIG. 1 is a perspective view of an example pallet sled.

FIG. 1 shows a pallet lift or sled 10 including a lift assembly 12 and a fork tine assembly 14 according to a first embodiment. The lift assembly 12 includes a base 16 with upright handles 18. Other handle arrangements could also be used.

The fork tine assembly includes a pair of fork tines 24. The tines 24 are each supported by a pivoting wheel assembly 26. In the example sled 10 shown, there is one wheel assembly 26 per fork tine 24. A brake handle 20 on the handles 18 is connected (via a cable and/or hydraulics or other mechanical advantage) and activates a brake assembly on each of the wheel assemblies 26, which will described further below. A lift handle 21 operates the lift mechanism in the lift assembly 12 (hydraulics, motor, etc) to selectively raise and lower the fork tines 24 relative to the floor and the base 16.

Figure 2:
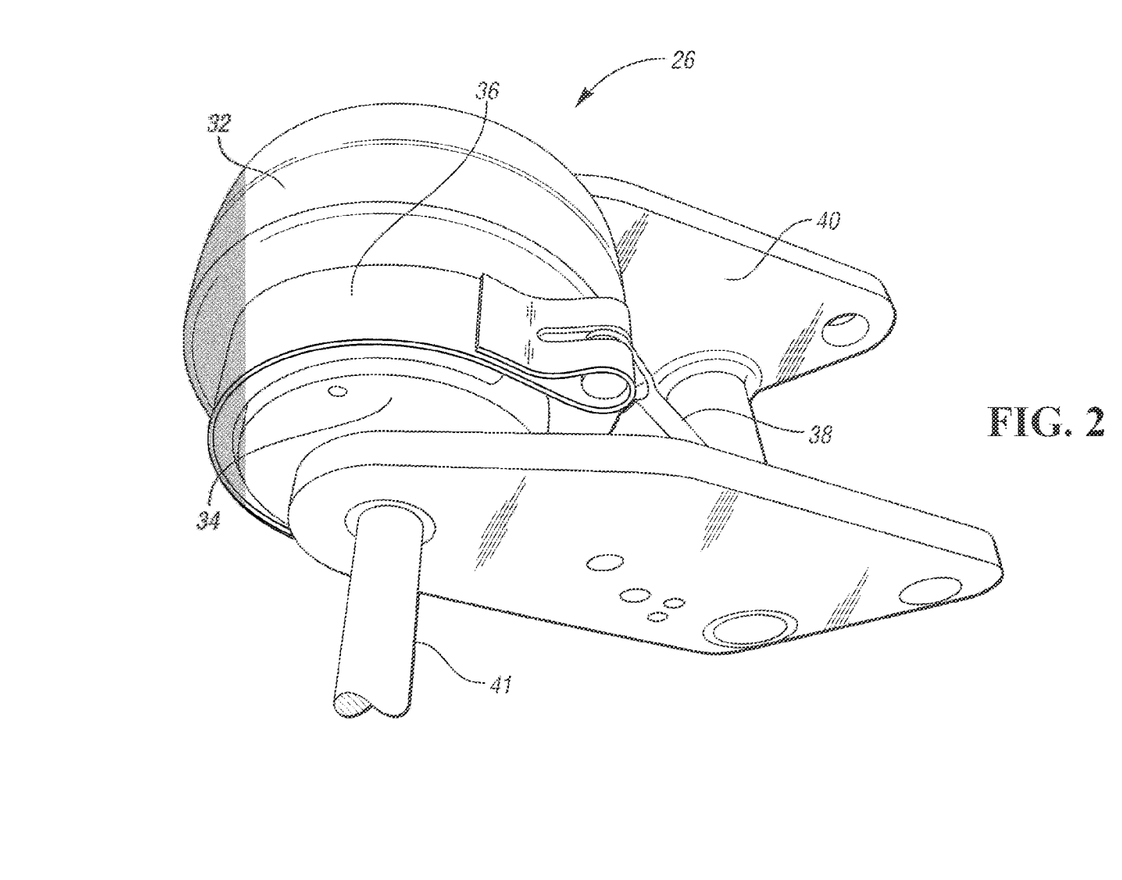
FIG. 2 is a front perspective view of a wheel assembly according to a first embodiment that could be used as the wheel assemblies in the sled of FIG. 1.

One of the wheel assemblies 26 is shown in FIG. 2. The other would be the mirror image. The wheel assembly 26 includes a wheel 32, which in this example is a wide, single wheel 32. The wheel 32 may have a durable, yet compliant tread, such as rubber or the like, and a brake assembly. The single wheel 32 permits sufficient space for a drum 34. The drum 34 may be a metal or composite cylinder that is smaller in diameter than the wheel 32. The drum 34 is permanently fixed to the wheel 32, which is concentric and rotates at the same speed.

A brake pad or shoe 36 may include a metal band with friction material on inside diameter. The brake pad 36 wraps most of the way around the drum 34 for increased stopping power. When activated, the brake pad 36 applies friction to the drum 34 to decrease speed of drum 34 and adjoined wheel 32, which in turn brakes and stops the sled 10.

A cable 38 is attached to the brake pad 36 at one end and to the brake handle 20 (FIG. 1) at the other. Each wheel assembly 26 may include a separate cable 38, each of which is connected to the brake handle 20.

A cradle 40 houses the wheel 32, drum 34 and brake pad 36. The cradle 40 supports opposite ends of an axle 41 on which the wheel 32 rotates. The cradle 40 pivots relative to the fork tine 24 when the fork tine 24 is raised and lowered.

By mounting the braking system on the fork tine wheel assemblies 26, the complication of braking the casters that pivot under the base is avoided. Braking on the fork tine wheels 32 creates more controlled braking since the fork tine wheels 32 are more centrally located with the pallet load.

Figure 3:
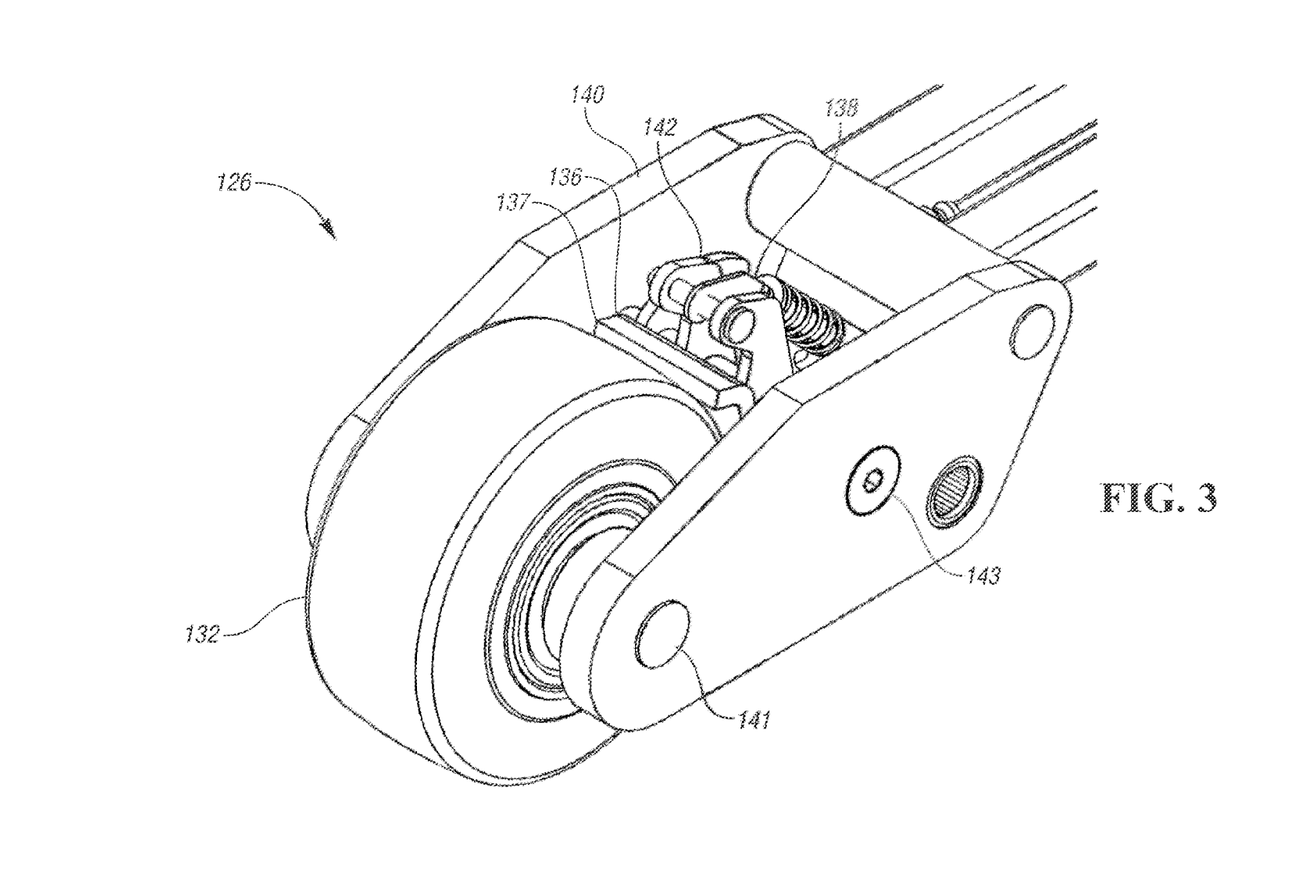
FIG. 3 is a front perspective view of a wheel assembly according to a second embodiment that could be used as the wheel assemblies in the sled of FIG. 1.

A second embodiment of a wheel assembly 126 is shown in FIG. 3. The wheel assembly 126 of FIG. 3 could be used for each of the wheel assemblies 26 of FIG. 1. The wheel assembly 126 includes a wheel 132, which in this example is a wide, single wheel 132.

A brake pad or shoe 136 may include a C-shaped body having two angled tabs 137 (one visible in FIG. 3) that are selectively applied directly to the wheel 132. A cam 142 behind the shoe 136 increases stopping power by forcing the brake pad 136 further into the wheel 132. When activated, the brake pad 136 applies friction to the wheel 132, which in turn brakes and stops the sled 10 (FIG. 1). The wheel 132 may have a durable, yet compliant tread, such as rubber or the like so that the brake pad 136 can bite into the wheel and provide greater stopping power.

Figure 4:
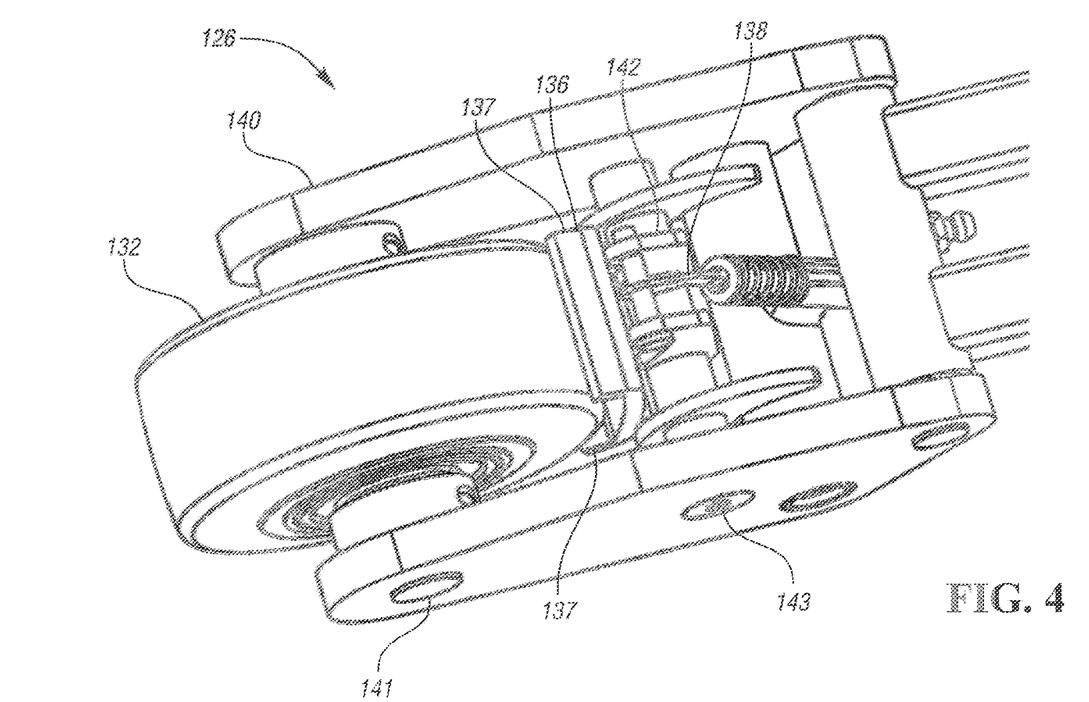
FIG. 4 is an upper perspective view of the wheel assembly of FIG. 3.
Figure 5:
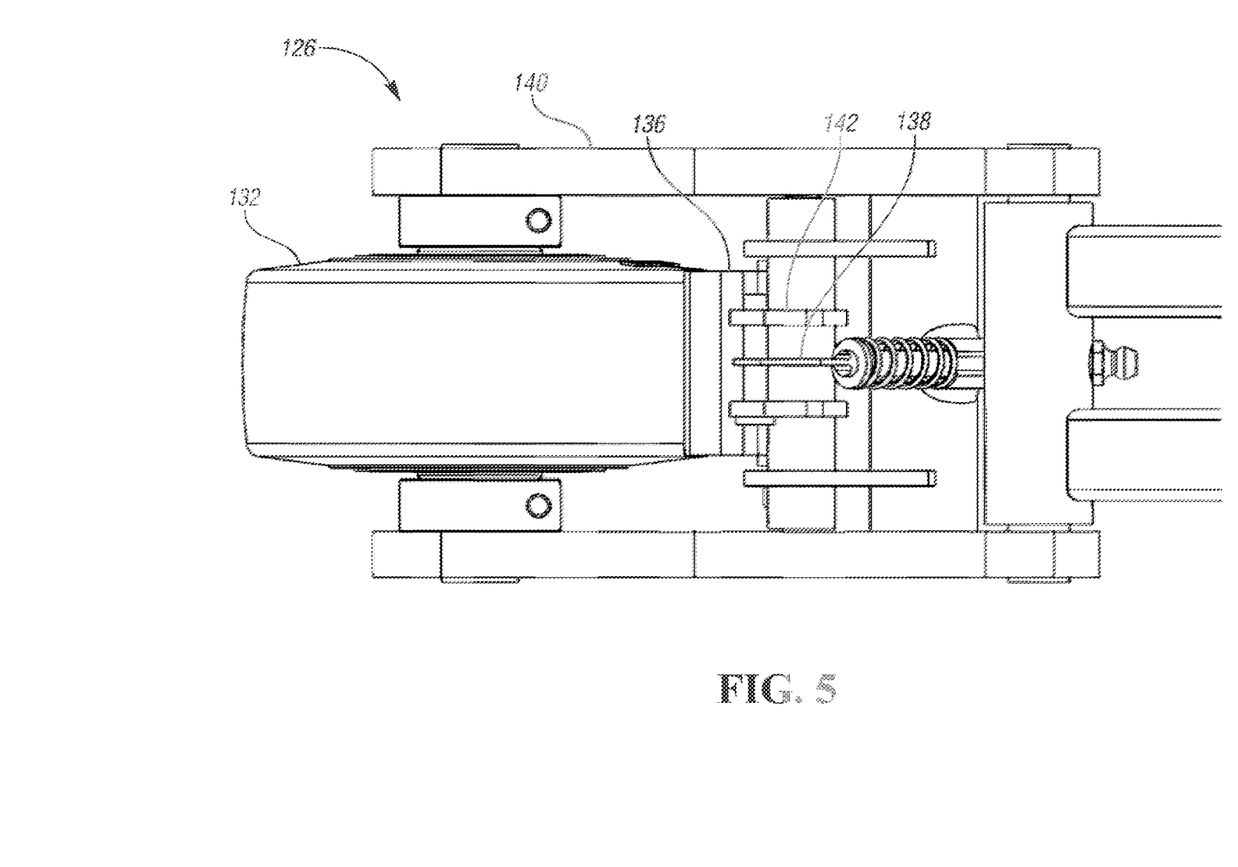
FIG. 5 is a top view of the wheel assembly of FIG. 3.
Figure 6:
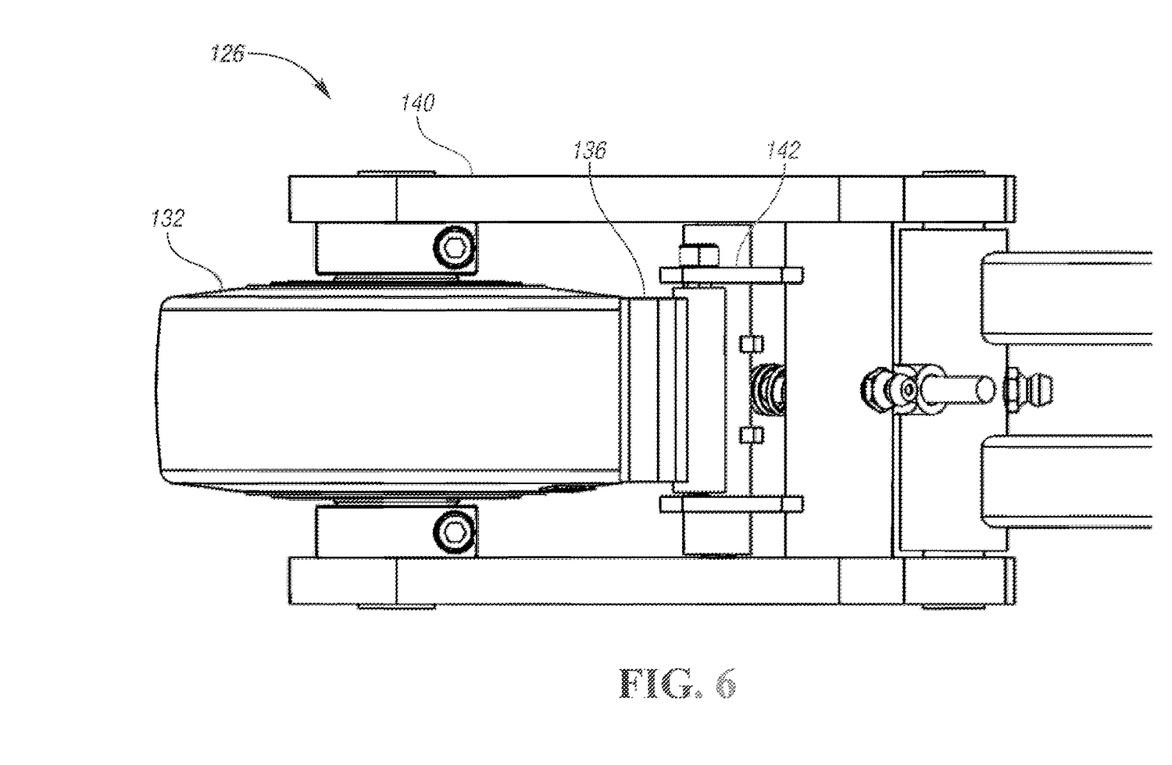
FIG. 6 is a bottom view of the wheel assembly of FIG. 3.

A cable 138 is attached to the cam 142 at one end and to the brake handle 20 (FIG. 1) at the other. A spring returns the brake shoe 136 to a disengaged position. Each wheel assembly 126 may include a separate cable 138, each of which may be connected to the brake handle 120. A cradle 140 houses the wheel 132, brake pad 136 and cam 142. The cam 142 pivots on a pivot pin 143 supported by the cradle 140. The cradle 140 pivots relative to the fork tine 124 (FIG. 1) when the fork tine 124 is raised and lowered. The cradle 140 supports opposite ends of an axle 141 on which the wheel 132 rotates. FIG. 4 is an upper perspective view of the wheel assembly 126 of FIG. 3. FIG. 5 is a top view of the wheel assembly 126 of FIG. 3. FIG. 6 is a bottom view of the wheel assembly 126 of FIG. 3.

Figure 7:
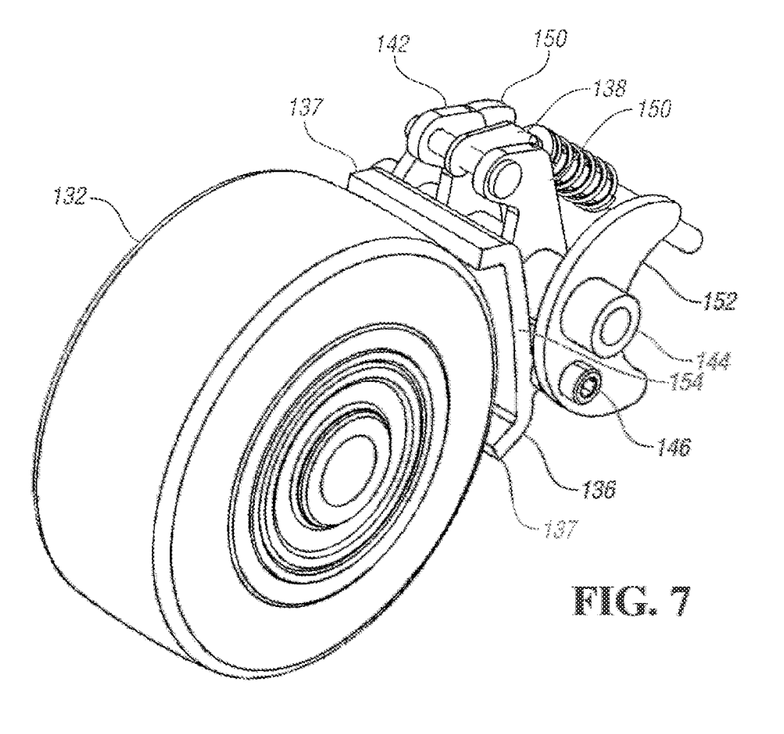
In FIG. 7 is a front perspective view of the wheel assembly of FIG. 3 with the cradle removed to show the other components of the wheel assembly.

In FIG. 7, the cradle 140 (FIG. 6) has been removed to show the other components of the wheel assembly 126 (FIG. 6). The cam 142 includes a pair of upper or first arms 150 to which the cable 138 connects and a pair of second arms or crescents 152 (one visible in FIG. 7). A first bushing 144 for pivoting about pivot pin 143 (FIG. 4) defines a pivot axis through the crescents 152. The first arms 150 extend upward from the first bushing 144 and pivot about the pivot axis through the bushing relative to the cradle 140 (FIG. 6). The crescents 152 are fixed to first bushing 144 and thus to the first arms 150. A second bushing 146 and pivot pin (not shown) connect the brake shoe 136 pivotably to the crescents 152 below the first bushing 144. As can be seen in FIG. 7, the brake shoe 136 includes a substantially straight, slightly curved base portion 154. The angled tabs 137 extend outward and forward from the base portion 154 at an angle more than 90 degrees, such as approximately 110 degrees.

Figure 8:
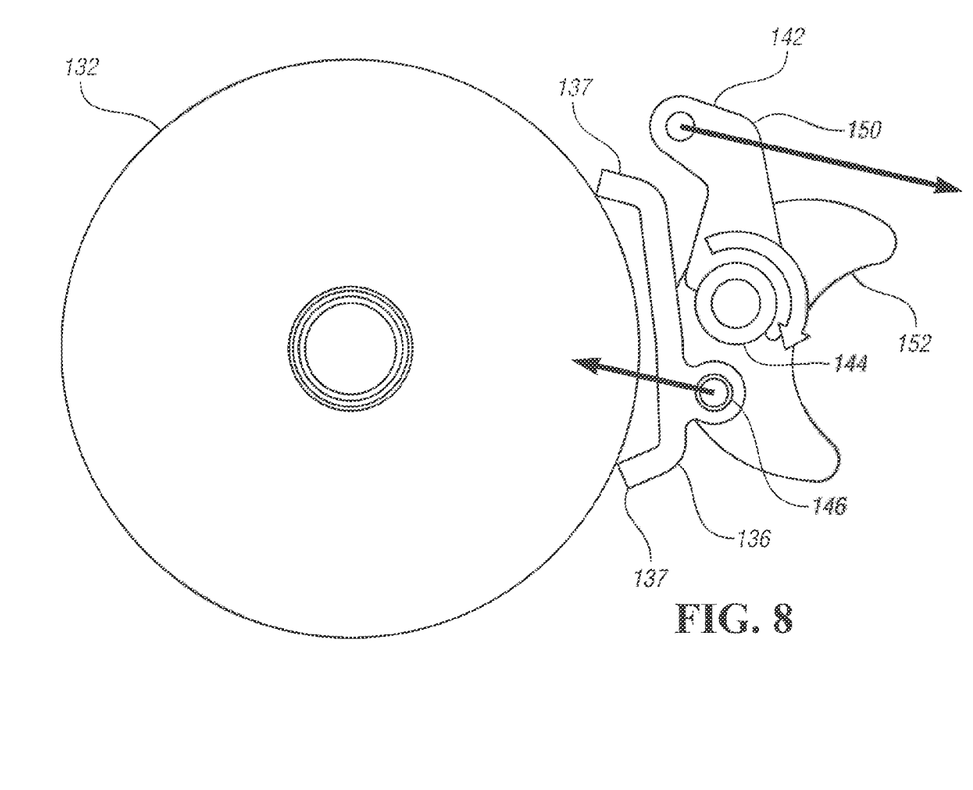
FIG. 8 is a schematic of the operation of the components of FIG. 7.

FIG. 8 is a schematic of the operation of the components of FIG. 7. When the upper end of the first arms 142 are pulled rearward (by the cable 138 shown in FIG. 7), this pivots the crescents 152 (clockwise in FIG. 8) about the pivot axis of the bushing 144. This forces the lower ends of the crescents 152 forward toward the wheel 132, which forces the brake shoe 136 against the wheel 132. Contact with the wheel 132 is primarily made by the angled tabs 137 and the brake shoe 136 pivots on bushing 146 such that both angled tabs 137 contact the wheel 132.

Figure 9:
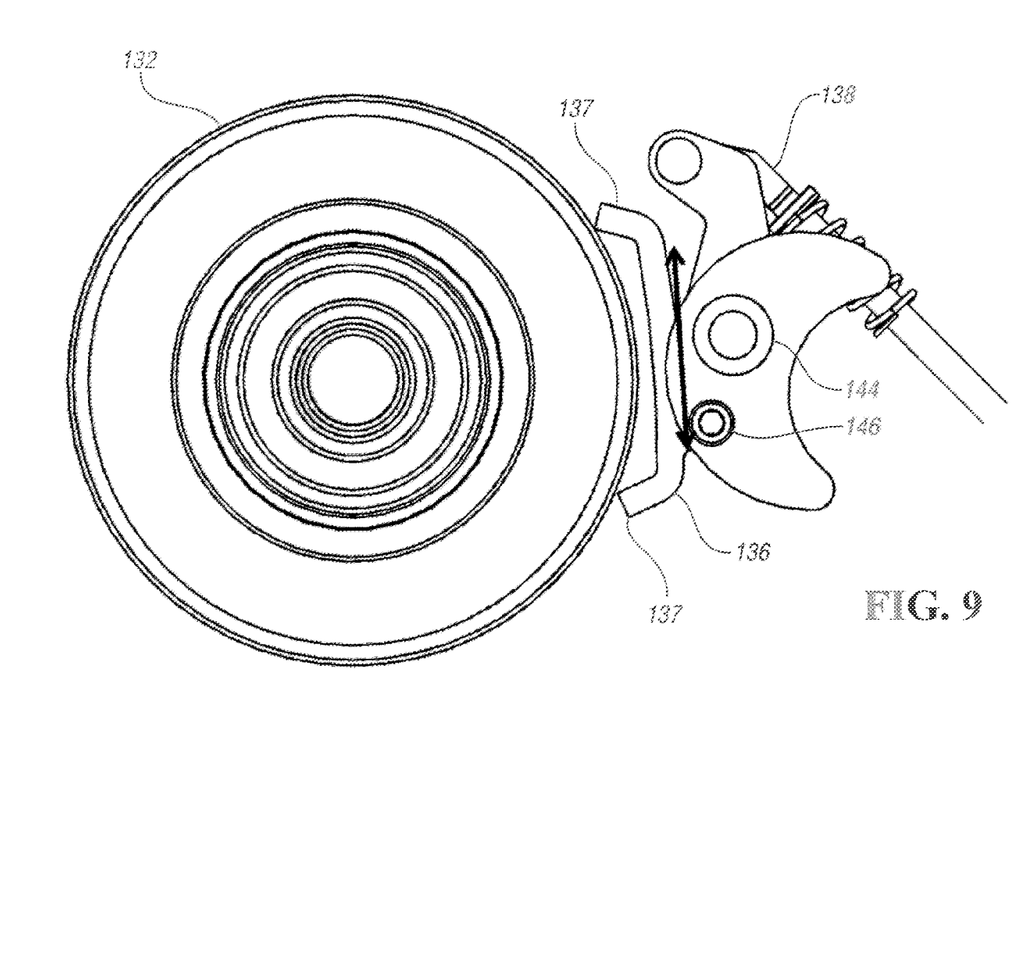
FIG. 9 is a side view of the components of FIG. 7.

Referring to FIG. 9, one angled tab 137 will be more effective for braking the wheel 132 in the forward direction, while the other angled tab 137 will be more effective for braking the wheel in the rearward direction. By repositioning the brake shoe 136 relative to the pivot point defined by the bushing 146 in one of the directions indicated by the arrow, the relative performance between forward and rearward braking can be adjusted.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A pallet sled including:
 a base including a pair of fixed, upright handles;
 a plurality of tines extending forward from the base, the plurality of tines including a first tine;
 a wheel assembly including a cradle pivotably connected to the first tine, the cradle configured to pivot relative to the first tine to raise and lower the first tine;
 a wheel rotatably mounted to the cradle below the first tine and supporting the first tine away from the base; and
 a brake assembly positioned adjacent the wheel to selectively brake the wheel.

2. The pallet sled of claim 1 wherein the brake assembly further includes a brake drum adjacent the wheel, and a brake shoe configured to selectively contact the brake drum.

3. The pallet sled of claim 1 wherein the brake assembly includes a brake shoe configured to selectively contact the wheel.

4. The pallet sled of claim 3 wherein the wheel assembly includes an axle on which the wheel rotates.

5. The pallet sled of claim 4 wherein the brake assembly includes a first arm pivotably connected to the cradle about a first axis and a second arm extending from the first axis to a second axis pivotably connected to the brake shoe.

6. The pallet sled of claim 5 wherein the brake assembly further includes a cable connected to the first arm.

7. The pallet sled of claim 6 wherein the brake shoe includes a pair of angled tabs at opposite ends of the brake shoe.

8. The pallet sled of claim 7 wherein the wheel is a first wheel and the brake assembly is a first brake assembly, the pallet sled further including a second wheel and second brake assembly associated with a second tine of the plurality of tines.

9. The pallet sled of claim 7 further including a brake handle mounted adjacent one of the handles, wherein the brake handle is configured to selectively cause the brake shoe to selectively engage the outer circumference of the wheel.

10. The pallet sled of claim 9 wherein the cable connects the brake handle to the first arm.

11. The pallet sled of claim 10 wherein the brake shoe pivots about an axis parallel to the axle of the wheel.

12. The pallet sled of claim 11 wherein the angled tabs are angled relative to a base portion of the brake shoe about axes parallel to the axle of the wheel.

13. The pallet sled of claim 12 wherein the axis about which the brake shoe pivots is closer to one of the angled tabs than the other of the angled tabs.

14. The pallet sled of claim 1 further including a brake handle mounted adjacent one of the upright handles and a cable connecting the brake handle to the brake assembly, wherein the brake handle is configured to selectively cause the brake assembly to selectively brake the wheel.

15. A pallet sled including:
 a base including a pair of fixedly upright handles;
 a plurality of base wheels supporting the base;
 a plurality of tines extending forward from the base;
 a cradle pivotably connected to each of the plurality of tines at a position spaced away from the base;
 a tine wheel rotatably supported below each of the plurality of tines by each cradle and supporting each of the plurality of tines; and
 a brake shoe positioned adjacent each of the tine wheels to selectively brake the tine wheel, the brake shoe configured to selectively engage an outer circumference of the tine wheel.

16. The pallet sled of claim 15 further including a first arm pivotably connected to each cradle about a first axis such that pivoting the first arm selectively engages the brake shoe against the tine wheel.

17. The pallet sled of claim 16 further including a second arm extending from the first axis to a second axis at which the second arm is pivotably connected to the brake shoe.

18. The pallet sled of claim 17 further including a brake handle mounted adjacent one of the handles, wherein the brake handle is configured to selectively cause the brake shoes to selectively engage the outer circumferences of the tine wheels.

19. The pallet sled of claim 18 further including a cable connecting the brake handle to the first arm.

20. The pallet sled of claim 19 wherein the base wheels supporting the base are casters.

21. The pallet sled of claim 15 further including a brake handle mounted adjacent one of the handles, wherein the brake handle is configured to selectively cause the brake shoes to selectively engage the outer circumferences of the tine wheels.

* * * * *